Sept. 12, 1933.  J. W. REGER  1,926,960
PISTON CONSTRUCTION
Filed Dec. 21, 1932  2 Sheets-Sheet 1
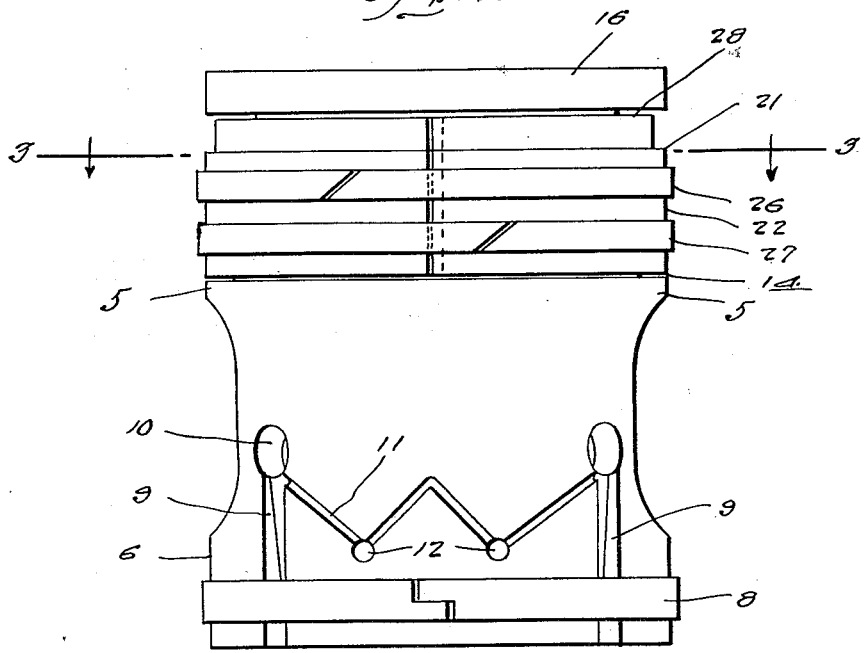
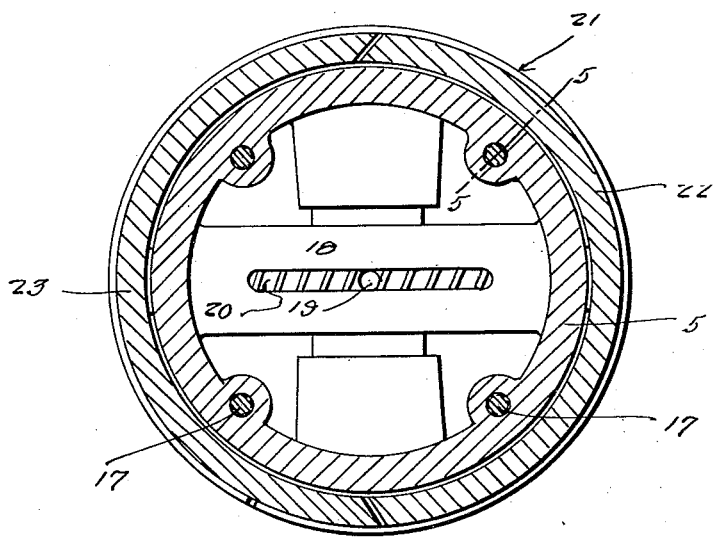
Inventor
Jacob W. Reger
By Clarence A. O'Brien
Attorney Sept. 12, 1933.  J. W. REGER  1,926,960
PISTON CONSTRUCTION
Filed Dec. 21, 1932  2 Sheets-Sheet 2
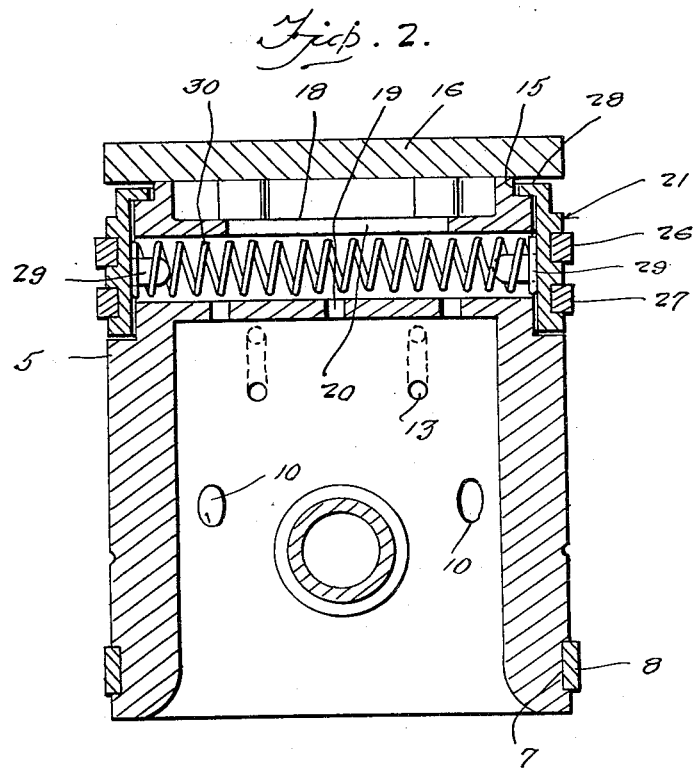
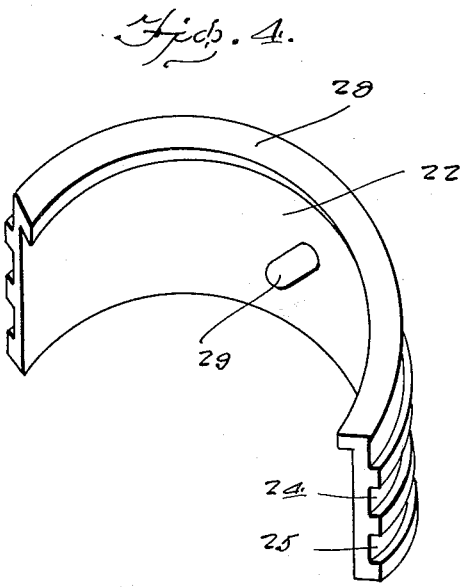
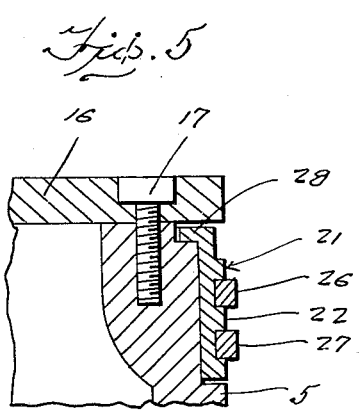
Inventor
Jacob W. Reger
By Clarence A. O'Brien
Attorney Patented Sept. 12, 1933

1,926,960

UNITED STATES PATENT OFFICE 1,926,960

PISTON CONSTRUCTION

Jacob Wasington Reger, Milan, Mo.

Application December 21, 1932
Serial No. 648,280

1 Claim. (Cl. 309—15)

This invention appertains to new and useful improvements in internal combustion engines, and more particularly to a piston.

The principal object of the present invention is to provide a piston having means thereon to prevent slapping action of the piston to the end that irregular wear on the cylinder walls will be eliminated.

Another important object of the invention is to provide a piston wherein the piston rings are mounted and adapted to bear uniformly against the walls of the companion cylinder.

Other important objects and advantages of the invention will become apparent to the reader of the following specification.

In the drawings:—

Figure 1 represents a side elevational view of the novel piston construction.

Fig. 2 represents a vertical sectional view through the piston construction.

Fig. 3 represents a horizontal sectional view taken substantially on line 3—3 of Fig. 1.

Fig. 4 represents a perspective view of one of the collar sections.

Fig. 5 represents a fragmentary detailed sectional view taken substantially on line 5—5 of Fig. 3.

Referring to the drawings wherein like numerals designate like parts, it can be seen that numeral 5 represents the piston proper having the skirt portion 6 in which a groove 7 is provided for receiving the anti-slap ring 8.

Vertically extending channels 9 in this portion of the piston extend from the lower edge of the piston portion 6 to the openings 10 and between these openings 10 are the zigzagged grooves 11, merging at points in openings 12 through this portion of the piston. This and the slanting ducts 13 in the upper portion of the piston communicating the collar groove portion with the interior portion of the piston makes up the lubricating means for the piston.

This collar channel 14 extends circumferentially of the upper portion of the piston and merges with the deeper channel 15 at the upper portion of the piston. The head of the piston may be an integral part of the piston or it may be removable in which case the head plate 16 is secured to the upper portion of the piston by suitable screws 17.

Extending diametrically across the interior of the piston at the upper end portion is the barrel 18 having openings 19 therein and a slot 20 in the top thereof, to permit access to the spring.

Numeral 21 generally refers to the collar which is made up of the sections 22 and 23. These collar sections have their ends cut off obliquely so that they will interlap in the manner substantially shown in Fig. 3.

The collar is provided with two circumferentially extending grooves 24—25 for receiving the split rings 26—27. The upper edge of this collar 21 is provided with an inwardly projecting circumferentially extending flange 28 for engagement into the aforementioned channel 15.

Each section of the collar is provided with a proturberance 29 which projects into one end of the barrel 18 in the manner substantially shown in Fig. 2. These protuberances prevent rotation of the collar on the piston and project into the ends of the coiled compressible springs 30 in the manner substantially shown in Fig. 2.

In the use of this piston, it will be observed, that the spring 30 normally serves to maintain the collar urged outwardly for increasing the tension of the piston rings. The rings 26—27 are affected by the springs to the extent that a uniform pressure application against the cylinder is obtained, to the end that there will be no slapping motion of the piston in operation.

It is to be understood that various features of the device can be duplicated without in any manner departing from the spirit of the invention.

While the foregoing specification sets forth the invention in specific terms, it is to be understood that changes may be made in the shape, size and materials without departing from the spirit and scope of the invention as claimed hereinafter.

Having thus described my invention, what I claim as new is:—

A piston construction comprising a body having a circumferentially extending groove, a sectional collar mounted in the groove, an expansible piston ring carried by the collar, said body having a pair of openings at diametrically opposite points in its side, a tubular cross member at the inside of the body having its ends connected to the body at the said openings, a spring interposed longitudinally in the tubular member between the sections of the collar and impinging against the said collar to urge the same outwardly of the body, said body being hollow and provided with a removable head, said tubular member being open at its top side to permit access to the interior thereof when the said head is removed.

JACOB WASINGTON REGER.